(12) United States Patent
Fang et al.

(10) Patent No.: US 10,610,929 B2
(45) Date of Patent: Apr. 7, 2020

(54) MOLTEN SALT DE-OXYGENATION OF METAL POWDERS

(71) Applicant: University of Utah Research Foundation, Salt Lake City, UT (US)

(72) Inventors: Zhigang Zak Fang, Salt Lake City, UT (US); Pei Sun, Salt Lake City, UT (US); Yang Xia, Salt Lake City, UT (US); Ying Zhang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 482 days.

(21) Appl. No.: 15/314,464

(22) PCT Filed: Dec. 2, 2015

(86) PCT No.: PCT/US2015/063540
§ 371 (c)(1),
(2) Date: Nov. 28, 2016

(87) PCT Pub. No.: WO2016/090052
PCT Pub. Date: Jun. 9, 2016

(65) Prior Publication Data
US 2017/0113273 A1    Apr. 27, 2017

Related U.S. Application Data

(63) Continuation of application No. PCT/US2015/030669, filed on May 13, 2015.
(Continued)

(51) Int. Cl.
*B22F 9/02* (2006.01)
*C22C 1/04* (2006.01)
(Continued)

(52) U.S. Cl.
CPC .......... *B22F 1/0088* (2013.01); *B22F 1/0014* (2013.01); *B22F 1/0085* (2013.01);
(Continued)

(58) Field of Classification Search
CPC .... B22F 2999/00; B22F 9/20; B22F 2201/01; B22F 9/01311; B22F 1/0014;
(Continued)

(56) References Cited

U.S. PATENT DOCUMENTS 2,205,854 A   6/1940   Kroll
2,427,338 A   9/1947   Alexander
(Continued)

FOREIGN PATENT DOCUMENTS

CA          665137 A     6/1963
CN       101603182 A    12/2009
(Continued)

OTHER PUBLICATIONS

PCT Application No. PCT/US2015/063540; Filing Date Dec. 2, 2015; Zhigang Zak Fang; International Search Report; dated Mar. 21, 2016; 9 Pages.
(Continued)

*Primary Examiner* — Lois L Zheng
(74) *Attorney, Agent, or Firm* — Thorpe North & Western, LLP

(57) ABSTRACT

Methods of removing oxygen from a metal are described. In one example, a method (100) can include forming a mixture (110) including a metal, a calcium de-oxygenation agent, and a salt. The mixture can be heated (120) at a de-oxygenation temperature for a period of time to reduce an oxygen content of the metal, thus forming a de-oxygenated metal. The de-oxygenation temperature can be above a melting point of the salt and below a melting point of the calcium de-oxygenation agent. The de-oxygenated metal
(Continued)

can then be cooled (130). The de-oxygenated metal can then be leached with water and acid to remove by-products and obtain a product (140).

21 Claims, 9 Drawing Sheets

Related U.S. Application Data

(60) Provisional application No. 62/086,524, filed on Dec. 2, 2014.

(51) Int. Cl.

| | |
|---|---|
| B22F 1/00 | (2006.01) |
| C22C 14/00 | (2006.01) |
| C22C 27/02 | (2006.01) |
| B22F 9/20 | (2006.01) |
| C22B 9/10 | (2006.01) |
| C22B 1/00 | (2006.01) |
| C22B 34/12 | (2006.01) |

(52) U.S. Cl.
CPC ............... *B22F 9/20* (2013.01); *C22B 1/005* (2013.01); *C22B 9/10* (2013.01); *C22B 34/1295* (2013.01); *C22C 1/04* (2013.01); *C22C 14/00* (2013.01); *C22C 27/02* (2013.01); *B22F 2201/013* (2013.01); *B22F 2201/11* (2013.01); *B22F 2301/205* (2013.01); *B22F 2304/10* (2013.01); *B22F 2304/15* (2013.01); *B22F 2998/10* (2013.01); *B22F 2999/00* (2013.01); *Y02P 10/212* (2015.11)

(58) Field of Classification Search
CPC ...... B22F 1/0085; B22F 1/0088; C22B 1/005; C22B 34/1295; C22B 9/10; C22C 1/04; C22C 14/00; C22C 27/02
See application file for complete search history.

(56) References Cited

U.S. PATENT DOCUMENTS

| | | |
|---|---|---|
| 2,773,787 A | 12/1956 | Rick |
| 2,804,375 A | 8/1957 | Kamlet |
| 2,834,667 A | 5/1958 | Rostron |
| 2,850,379 A | 9/1958 | Hawkes |
| 2,984,560 A | 5/1961 | Dombrowski |
| 3,140,170 A | 7/1964 | Henrie et al. |
| 3,472,648 A | 10/1969 | Suriani |
| 3,721,549 A | 3/1973 | Gallay et al. |
| 3,903,239 A | 9/1975 | Berkovich |
| 3,909,241 A | 9/1975 | Cheney |
| 3,988,524 A | 10/1976 | Dreyer |
| 4,478,611 A | 10/1984 | Selden |
| 4,923,531 A | 5/1990 | Fisher |
| 4,943,322 A | 7/1990 | Kemp, Jr. et al. |
| 5,084,091 A | 1/1992 | Yolton |
| 5,102,452 A | 4/1992 | Taskinen et al. |
| 5,460,642 A | 10/1995 | Leland |
| 5,503,655 A | 4/1996 | Joseph |
| 5,779,761 A | 7/1998 | Armstrong et al. |
| 5,830,420 A | 11/1998 | Borowiec et al. |
| 6,126,712 A | 10/2000 | Hohne et al. |
| 6,152,982 A | 11/2000 | Froes et al. |
| 6,231,636 B1 | 5/2001 | Froes et al. |
| 6,264,719 B1 | 7/2001 | Zhang et al. |
| 6,475,428 B1 | 11/2002 | Fraval et al. |
| 6,508,980 B1 | 1/2003 | Sachs et al. |
| 6,540,902 B1 | 4/2003 | Redey et al. |
| 7,297,271 B2 | 11/2007 | Onishi et al. |
| 7,585,457 B2 | 9/2009 | Zhang et al. |
| 7,846,232 B2 | 12/2010 | Pretorius |
| 8,007,562 B2 | 8/2011 | Kasparov et al. |
| 8,092,570 B2 | 1/2012 | Boulos et al. |
| 8,148,281 B2 | 4/2012 | Taniguchi et al. |
| 8,302,661 B2 | 11/2012 | Forbes Jones et al. |
| 8,328,899 B2 | 12/2012 | Adam et al. |
| 8,388,727 B2 | 3/2013 | Klevtsov et al. |
| 8,845,998 B2 | 9/2014 | Ishikawa |
| 8,871,303 B2 | 10/2014 | Han et al. |
| 9,067,264 B2 | 6/2015 | Moxson et al. |
| 2001/0019742 A1 | 9/2001 | Itsukaichi et al. |
| 2002/0198601 A1* | 12/2002 | Bales .................... A61B 17/80 |
| | | 623/23.55 |
| 2003/0110890 A1 | 6/2003 | He et al. |
| 2004/0025632 A1 | 2/2004 | Boily et al. |
| 2004/0103751 A1 | 6/2004 | Joseph et al. |
| 2004/0155995 A1 | 8/2004 | Yu et al. |
| 2005/0137078 A1 | 6/2005 | Anderson et al. |
| 2006/0236811 A1 | 10/2006 | Withers et al. |
| 2007/0110655 A1 | 5/2007 | Xie |
| 2009/0067121 A1 | 3/2009 | Mizusaki et al. |
| 2009/0107294 A1 | 4/2009 | Nishioka et al. |
| 2010/0061925 A1 | 3/2010 | Lee et al. |
| 2010/0064852 A1* | 3/2010 | Zhang .................. B22F 1/0088 |
| | | 75/366 |
| 2010/0112350 A1 | 5/2010 | Tanimizu et al. |
| 2011/0039103 A1 | 2/2011 | Calado Da Silva |
| 2011/0103997 A1 | 5/2011 | Kogut et al. |
| 2011/0171116 A1 | 7/2011 | Klevtsov et al. |
| 2012/0070578 A1 | 3/2012 | Han et al. |
| 2012/0230860 A1 | 9/2012 | Ward-Close et al. |
| 2012/0272788 A1 | 11/2012 | Withers et al. |
| 2012/0282469 A1 | 11/2012 | Nahas |
| 2013/0000449 A1 | 1/2013 | Van Vuuren et al. |
| 2013/0220211 A1 | 8/2013 | Dutta |
| 2013/0315773 A1 | 11/2013 | Moxson et al. |

FOREIGN PATENT DOCUMENTS

| | | |
|---|---|---|
| CN | 102277595 A | 12/2011 |
| CN | 103785406 A | 5/2014 |
| EP | 1770176 A1 | 4/2007 |
| EP | 2718473 A1 | 4/2014 |
| GB | 800689 | 8/1958 |
| GB | 807889 | 1/1959 |
| WO | WO 2010/036131 | 4/2010 |
| WO | WO 2012/148471 A1 | 11/2012 |
| WO | WO 2012/172279 A1 | 12/2012 |
| WO | WO 2015/050637 | 4/2015 |

OTHER PUBLICATIONS

Arifvianto et al, "Fabrication of Metallic Biomedical Scaffolds with the Space Holder Method: A Review", Materials, May 6, 2014, pp. 3588-3622, vol. 7, No. 5, ISSN 1996-1944.

Astrelin et al, "Interaction of TiHx (x>2) with solutions of some acids and alkalies." Hydrogen Materials Science and Chemistry of Metal Hydrides. 2002;82:133-40.

Bolivar et al, "Recycling, Synthesis of titanium via magnesiothermic reduction of TiO2 (Pigment)", Proceedings of EMC (2009) 1-17.

Chen et al, "Direct Electrochemical Reduction of Titanium Dioxide to Titanium in Molten Calcium Chloride." Nature. 2000;407:361-4.

Crowley, "A new process for titanium extraction and production promises to cut costs and expand applications", Advanced materials & processes (2003) 25-27.

Fang et al, "A new, energy-efficient chemical pathway for extracting Ti Metal from Ti minerals", JACS 135 (2013) 18248-18251.

Froes, "The production of low-cost titanium powders." JOM. 1998;50(September):41-3.

Froes, "Titanium powder metallurgy: a review—Part 1: titanium and its alloys are the materials of choice for many applications, but high cost often negates their use. Powder metallurgy offers a cost-effective fabrication approach", Advanced Materials & Processes 170.9, Sep. 2012, 6 pages, vol. 16, No. 7.

Gueguin, "Chemistry and mineralogy of titanium-rich slags. Part I—Hemo-ilmenite, sulphate, and upgtaded titania slags", Mineral Processing & Extractive Metall. Rev. 28 (2007) 1-58.

(56) References Cited

OTHER PUBLICATIONS

Hartman et al, "Producing lower-cost titanium for automotive applications", JOM 50 (1998) 16-19.

Hunter, "Metallic titanium", JACS 32 (1910) 330-336.

Kikuchi et al, "Rapid reduction of titanium dioxide nano-particles by reduction with a calcium reductant", J. Phys. Chem. Solids 75 (2014) 1041-1048.

Kroll, "The production of ductile titanium." Trans Met Soc AIME. 1959;215:546-53.

Lasheen, "Soda ash roasting of titania slag product from Rosetta ilmenite." Hydrometallurgy. 2008;93(3-4):124-8.

Lin, "The effect of alkali salt catalyst on the carbothermic reduction of nickel oxide." Metallurgical Transactions B. 1987;19B:685-6.

Middlemas et al, "A new method for production of titanium dioxide pigment", Hydrometallurgy 131 (2013) 107-113.

Middlemas, "Energy-conscious production of titania and titanium powders from slag", University of Utah, (2014).

Nersisyan et al, "Direct magnesiothermic reduction of titanium dioxide to titanium powder through combustion synthesis", Chem. Eng. J. 235 (2014) 67-74.

Oh et al, "Deoxidation of Ti powder and preparation of Ti ingot with low oxygen concentration", Mater. Trans. 53 (2012) 1075-1077.

Oh et al, "Preparation of low oxygen content alloy powder from Ti binary alloy scrap by hydrogenation-dehydrogenation and deoxidation process", J. Alloys Compd. 593 (2014) 61-66.

Okabe et al, "Titanium powder production by preform reduction process (PRP)", J. Alloys Compd. 364 (2004) 156-163.

Rao et al, "Catalysis by alkali carbonates of carbothermic reduction of magnetite concentrates." Ironmaking and Steelmaking. 198441(6):308-18.

Suzuki et al, "Calcium-deoxidation of niobium and titanium in Ca-saturated $CaCl_2$ molten salt", J. Alloys Compd. 288 (1999) 173-182.

Technologies E. Summary of Emerging Titanium Cost Reduction Technologies. Vancouver, WA2004. p. 12.

Vuuren et al, "Opportunities in the Electrowinning of Molten Titanium from Titanium Dioxide", JOM, Oct. 2005, 3 pages.

Won et al, "Titanium powder prepared by a rapid exothermic reaction", Chem. Eng. J. 157 (2010) 270-275.

Xu et al, "Behavior of calcium chloride in reduction process of titanium dioxide by calcium vapor", J. Alloys Compd. 576 (2013) 208-214.

Xue, "Production of Titanium Dioxide by Decomposition of Titanium Slag with Molten Sodium Hydroxide", Dalian University of Technology, (2009).

Zhang et al, "A literature review of titanium metallurgical processes", Hydrometallurgy 108 (2011) 177-188.

Zhang et al, "A novel preparation of titanium dioxide from titanium slag." Hydrometallurgy. 2009;96(1-2):52-6.

Zheng et al, "Production of titanium powder by the calciothermic reduction of titanium concentrates or ore using the preform reduction process", Mater. Trans. 48 (2007) 2244-2251.

Extended European Search Report dated Jul. 25, 2018, in EP Application No. 15865502.7, filed Dec. 2, 2015; 12 pages.

\* cited by examiner

MOLTEN SALT DE-OXYGENATION OF METAL POWDERS

RELATED APPLICATIONS

This application claims priority to U.S. Provisional Patent Application No. 62/086,524, filed Dec. 2, 2014 and PCT International Application No. PCT/US15/30669, filed May 13, 2015, which are each incorporated herein by reference.

BACKGROUND

Powder metallurgy is often used to create products composed of pure metals or metal alloys. A powdered metal or multiple powdered metals blended together are compacted into a desired form. The powdered metal is then sintered by heating the powdered metal until the metal particles bond together. Metal powders have recently been used with additive manufacturing techniques, such as 3D printing and laser sintering.

The presence of oxygen in metal powders, especially reactive metals such as titanium (Ti), can often compromise sintering and final product properties such as strength and toughness. Numerous de-oxygenation processes are known and include calcium based de-oxygenation. However, current de-oxygenation processes can involve relatively high temperatures (normally >900° C.), and can be complex to implement.

SUMMARY

Methods of removing oxygen from a reactive metal can include forming a mixture including a metal, a calcium de-oxygenation agent, and a salt. The mixture can be heated at a de-oxygenation temperature for a period of time to reduce an oxygen content of the metal, thus forming a de-oxygenated metal. The de-oxygenation temperature can be above a melting point of the salt and below a melting point of the calcium de-oxygenation agent. The de-oxygenated metal can then be cooled and then leached with water and acid to remove by-products and obtain a final product.

In another example, a method of removing oxygen from a reactive metal powder can include forming a powder mixture by mixing a calcium de-oxygenation agent with a metal powder to be de-oxygenated according to a specific ratio depending on an amount of oxygen to be removed. The calcium de-oxygenation agent can include at least one of solid calcium (Ca) and calcium hydride ($CaH_2$). The powder mixture can be blended with a salt having a melting point below a melting point of the calcium de-oxygenation agent to form a blended mixture. The blended mixture can be heated to a high temperature to produce a molten salt as a medium for a period of time, in an inert or reducing atmosphere, sufficient to reduce the oxygen content of the metal powder below a predetermined oxygen threshold to form a de-oxygenated metal powder. The high temperature can be above a melting point of the salt and below the melting point of the calcium de-oxygenation agent The de-oxygenated metal powder can then be cooled and then leached with water and acid to remove by-products and obtain a final product.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
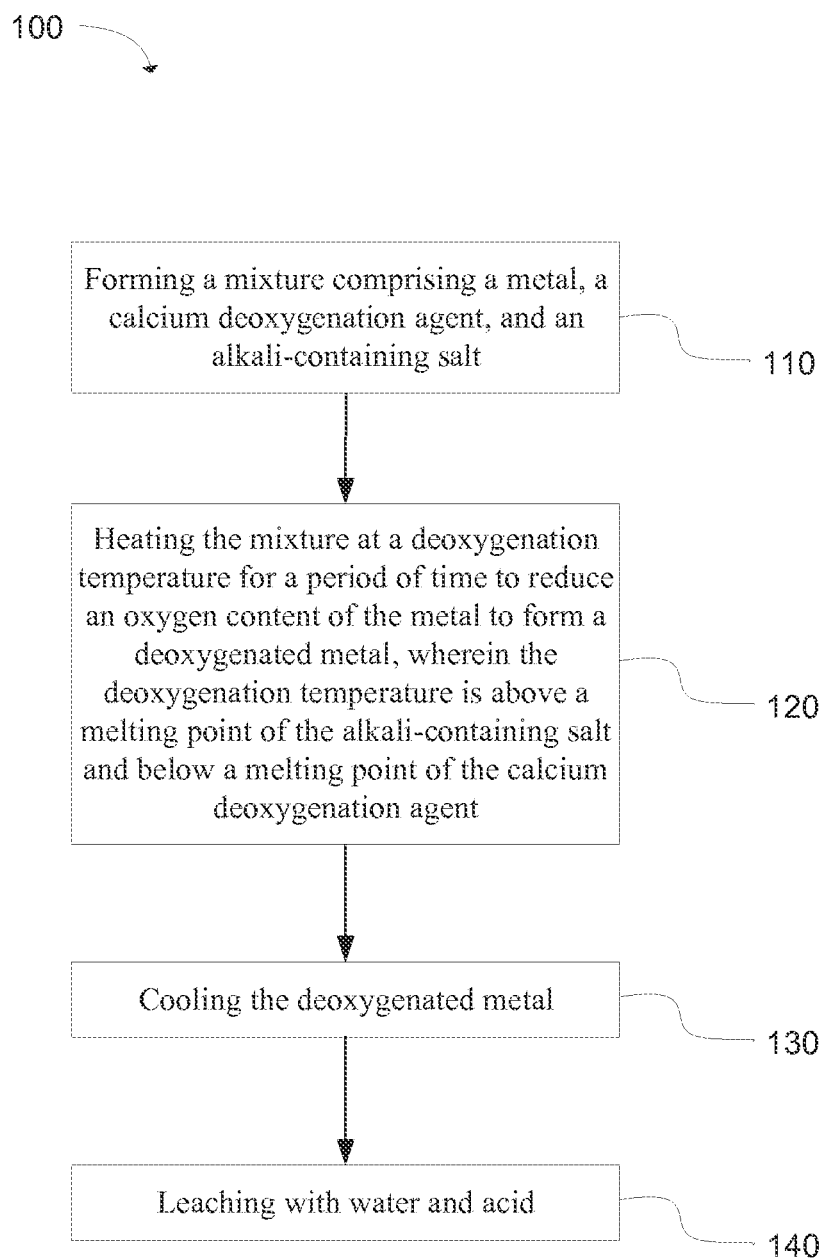
FIG. 1 is a flow chart outlining a method of removing oxygen from a metal, in accordance with an embodiment of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "sintering" refers generally to a process of heating compacted metal powder to fuse the metal powder particles together. Normally, "sintering" means heating to and hold at a sufficient temperature for a sufficient length of time to achieve full or nearly full densification per standard commercial specifications. However, "partial sintering" refers to heating that achieves partial densification, resulting in a partially sintered product that is less dense than a fully sintered product.

Averages may be given with respect to properties of particles in some embodiments of the present invention. Unless otherwise stated, all average values of such properties are number-averages based on the individual particles. For example, "average particle size" refers to the number-average particle size.

The singular forms "a," "an," and "the" include plural referents unless the context clearly dictates otherwise. Thus, for example, reference to "a particle" includes reference to one or more of such materials and reference to "sintering" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

As used herein, the term "at least one of" is intended to be synonymous with "one or more of." For example, "at least one of A, B and C" explicitly includes only A, only B, only C, and combinations of each (e.g. A+B, B+C, A+C, and A+B+C).

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Molten Salt De-Oxygenation of Metal Powders

Powder metallurgy can be a low cost alternative to traditional melt-and-wrought metallurgy technologies. However, powder metallurgy also presents challenges. With some source metals, the cost of production of powders to use as source materials can be very high, minimizing the advantages and competitiveness of the powder metallurgy approach. In particular, titanium metal is a good candidate for powder metallurgy, but titanium metal powder can be very expensive to produce.

One reason for the high cost of titanium powder is the chemical affinity of titanium for oxygen. This chemical affinity is apparent from Ti—O bond energy of 2.12 eV that is comparable to the Ti—Ti bond energy of 2.56 eV. Further, oxygen has a high solubility (up to 14.3 wt. %) in Ti in solid state, which is detrimental to the mechanical properties of Ti alloys. The solubility of oxygen in Ti can increase with increasing temperature, making it more difficult to perform high temperature processing of Ti powder while maintaining a low oxygen content. Thus, Ti metal powder can be prone to pick up oxygen during powder processing. For these reasons, Ti metal powder with low oxygen content can be difficult to produce.

Accordingly, the present invention provides methods of removing oxygen from metal powders. In some embodiments, the methods can involve relatively low temperatures. The solubility of oxygen and reactivity of the metal powder with oxygen can be relatively low at the temperatures employed in the present methods. Thus, the present methods can allow metal powders with very low oxygen content to be produced. Removing oxygen at lower temperatures can also reduce the energy cost of the process, thereby making the produced metal powder less expensive to produce.

The present methods can also be used to produce metal powder materials for additive manufacturing methods such as laser sintering and other 3D printing methods. For example, advances in 3D printing technology have increased demand for spherical titanium powders with specific particle size and size distributions. With regard to 3D printing using metal powders, titanium is a popular material for fabricating products. For example, titanium alloys are used to make biomedical implant and prosthetics. 3D printing can be used to create a biomedical implant that is custom designed for a specific patient. Fabrication of complex components for aircraft is another exemplary use of 3D printing with titanium. Advantages of using 3D printing to manufacture components include the cost savings from not needing to fabricate expensive models or molds, the ability to build components with complex geometries that are difficult to fabricate using conventional machines, the ability to customize parts that are optimized for a specific application without a need for large quantities, among other advantages.

However, titanium powders for 3D printing of titanium parts are generally subject to rather strict requirements. Some 3D printing applications require spherically-shaped particles. A specific particle size and narrow size distribution may also be required. Further, oxygen content of the powder can be required to meet a certain standards specification or end user requirements, such as the ASTM standards for titanium.

Spherical fine titanium powders are also useful for injection molding of titanium parts. Metal powder injection molding (MIM) is a low cost manufacturing technique for making small parts with complex geometry and for large quantities.

The present methods de-oxygenate metal powders at relatively low temperatures. In some cases such low temperatures can be helpful for retaining a spherical shape of the particles and avoiding sintering the particles during de-oxygenation. When higher temperatures are used, such as in some calciothermic processes for de-oxygenating titanium, the particles can become sintered or caked together with the de-oxygenation agents and/or the salt, requiring grinding or milling to separate the particles after de-oxygenation. For example, the known DOSS (De-oxidation in Solid State) process requires excess liquid calcium and a high temperature to ensure good contact (solid-liquid) between calcium and titanium for reducing oxygen in Ti-6Al-4V powder. This process typically operates above 900° C. In such methods, sintering between particles and caking of the entire mixture of the metal powder with de-oxygenation agent leads to difficulty separating the metal powder and maintaining the spherical morphology and flowability of the metal powder. This can decrease the usefulness of the metal powder for additive manufacturing. In contrast, the present invention provides methods of de-oxygenating metal powders at lower temperatures, thereby avoiding sintering of the metal powder particles during de-oxygenation.

With this description in mind, FIG. 1 is a flowchart of a method 100 of removing oxygen from a metal, in accordance with an embodiment of the present invention. The method includes forming a mixture comprising a metal, a calcium de-oxygenation agent, and an alkali halide-containing salt 110; heating the mixture at a de-oxygenation temperature for a period of time to reduce an oxygen content of the metal to form a de-oxygenated metal, wherein the de-oxygenation temperature is above a melting point of the alkali halide-containing salt and below a melting point of the calcium de-oxygenation agent 120; and cooling the de-oxygenated metal 130. In many cases, the method can also include, leaching the de-oxygenated metal with water and acid to obtain a final de-oxygenated product 140.

Because the de-oxygenation temperature is below the melting point of the calcium de-oxygenation agent, the calcium de-oxygenation agent can be in a solid state during the de-oxygenation. Additionally, the de-oxygenation temperature is above the melting point of the alkali-containing salt so that the calcium-containing salt is a molten liquid during the de-oxygenation. In some embodiments, the calcium de-oxygenation agent can be at least partially soluble in the molten alkali-containing salt. Thus, at least a portion of the solid calcium de-oxygenation agent can dissolve in the molten salt.

Without being bound to a specific mechanism, it is believed that the calcium de-oxygenation agent can dissolve in the molten salt to form $Ca^+$ ions, $Ca^{2+}$ ions, and electrons. The $Ca^{2+}$ ions can then react with oxygen atoms in the metal powder to form CaO, thus de-oxygenating the metal powder. The mechanism can be illustrated generally in FIG. 9 and described in more detail subsequently. In some cases the electrons can react with oxygen atoms in the metal powder to form $O^{2-}$ ions, which are also soluble in the molten salt. When the amount of dissolved $O^{2-}$ ions in the molten salt reaches its solubility limit, the $O^{2-}$ ions can react with the $Ca^{2+}$ ions to form CaO. The reaction of oxygen atoms with electrons at surfaces of the metal powder particles, as well as reaction of oxygen with $Ca^{2+}$ to form CaO, can decrease the concentration of oxygen near the surfaces of the metal powder particles. This creates a concentration gradient that drives additional oxygen atoms to diffuse to the surfaces of the metal powder particles. In this way, oxygen dissolved in the metal powder can be removed and converted to CaO.

Accordingly, in some embodiments the de-oxygenation can be performed by calciothermic de-oxygenation. The de-oxygenation agent can include calcium metal (Ca), calcium hydride ($CaH_2$), or combinations thereof.

The alkali halide-containing salt can generally include at least one of an alkali metal halide salt and an alkaline earth metal halide salt. Additionally, in further embodiments a calcium-containing salt can act as a flux or media that facilitates reactions between the calcium de-oxygenation agent and oxygen in the metal. In some examples, the calcium containing salt can include a calcium halide salt such as $CaCl_2$, $CaBr_2$, $CaI_2$, or combinations thereof. In further examples, the calcium-containing salt can also include a secondary halide salt of a metal other than calcium. For example, the secondary salt can be an alkali halide salt such as KCl, KBr, KI, LiCl, LiBr, LiI, NaCl, NaBr, NaI, CsCl, CsBr, CsI, or combinations thereof. In a particular example, the calcium-containing salt can include $CaCl_2$ and a secondary salt that is KCl, LiCl, or combinations thereof. In some cases, the calcium halide-containing salt can be a eutectic salt mixture, such as a calcium halide-alkali halide eutectic salt, calcium halide-calcium halide eutectic salt, or combinations of these salts.

Regardless, the alkali halide-containing salt can have a melting point that is below a melting point of the calcium de-oxygenation agent. In certain examples, the calcium halide-containing salt can have a melting point from about 400° C. to about 770° C. When the alkali-containing salt is a mixture of two or more salts, the types and amounts of the salts can be selected so that the melting point of the mixture is below the melting point of the calcium de-oxygenation agent. A variety of combinations of types and amounts of different salts can be used to achieve a suitable melting point. However, in some embodiments the calcium halide-containing salt can include at least 0.01 wt. % calcium halide salt. This can allow calcium ions to form in the molten salt solution to react with oxygen in the metal. Secondary salts such as LiCl or KCl can lower the overall melting point of the salt mixture to create a low temperature reaction environment. Low temperature operating conditions can provide advantages such as lower energy requirements, less corrosive and thermal damage to the reaction vessel, more options for reaction vessel materials and equipment, reduced loss of calcium de-oxygenation agent through evaporation, continuous open-reactor production made possible by the reduced loss of the calcium de-oxygenation agent through evaporation, and easier leaching, crushing, and retaining the original size and morphologies of metal powder particles because less sintering occurs between the particles.

Thus, in some examples, using a eutectic mixture of two salts can allow for a lower reaction temperature than using a single salt. However, using a single salt can in some cases simplify subsequent processing steps, such as recovering and recycling the salt after the de-oxygenation is complete. Therefore, in some examples the calcium-containing salt can be substantially only a single calcium halide salt. In one example, the calcium-containing salt can be calcium chloride.

The methods according to the present invention can be used to remove oxygen from a wide range of metals that are sensitive to oxygen impurities. The metals suitable for the current process include titanium (Ti), titanium hydride ($TiH_2$), titanium oxide ($TiO_2$), aluminum (Al), vanadium (V), niobium (Nb), tantalum (Ta), zirconium (Zr), tungsten (W), molybdenum (Mo), hafnium (Hf), thorium, chromium, alloys of these, and alloys of the above with one or other metals or non-metals. Titanium, niobium, zirconium and vanadium can be of particular interest. The reactive metals can also include some rare earth metals, such as Nd, Dy, which are less stable in the oxide form than the deoxidant oxide. Reactive metal hydrides of the listed reactive metals can also be de-oxygenated using these processes. The reactive metals hydrides can be the hydrides of the metals mentioned above. In certain examples, the metal can be a titanium alloy such as Ti-6Al-4V. In additional examples, the metal can include CP—Ti, Ti-6Al-4V, titanium scrap, $TiO_2$, $TiH_2$, a nickel-based high temperature alloy, or combinations thereof.

In still further examples, the metal can be a recovered titanium scrap material. During manufacturing of titanium components, structures, and devices using titanium alloys, machining chips of metal are often generated. The scrap metal can also be generated simply because metal pieces are discarded. Scrap titanium (e.g. Ti-6Al-4V) and other titanium alloys can be used as the source metal for de-oxygenation to make titanium materials having reduced oxygen content. Scrap titanium can be sorted, cleaned, and prepared for processing using the methods described herein.

The metal or metal hydrides can be in various forms including large or small milled or finished articles, scrap material, turning, cuttings, chips, chunks, powders, or the like. In some embodiments, the metal can be in form of a metal powder. The metal powder can be de-oxygenated and then used in various methods of powder metallurgy. The metal powder can also include alloying ingredients. For example, titanium hydride powder can be blended with aluminum and vanadium powders, or an Al—V alloy powder that is known in the industry as "master alloy" powder, in the correct amounts to create Ti-6Al-4V. Other alloying elements for Ti including Fe, Nb, Zr, Mo, and so forth, can be blended to form other alloys.

In certain examples, the metal powder can be used for additive manufacturing methods such as laser sintering. In some cases, a narrow particle size distribution and uniform particle shape can be helpful in additive manufacturing. Thus, in some examples the metal powder can have a narrow particle size distribution such that more than about 80% of particles in the metal powder have a particle size within 20% of the average particle size of the metal powder. The average particles size of the metal powder can be any size suitable for a particular application in powder metallurgy, additive manufacture, or for other uses. In one example, the metal powder can have an average particle size from about 1 micrometers to about 1000 micrometers. In another example, the metal powder can have an average particle size from about 1 micrometers to 200 μm, in some cases up to about 10 mm, and in some cases up to 3 cm, and in other cases up to 5 cm. As used herein, "particle size" refers to the particle diameter for spherical particles, or to the longest dimension or axis of a particle for non-spherical particles.

In further examples, the metal powder can be substantially spherical. In a specific example, the substantially spherical metal powder can have an average particle aspect ratio of less than 1.5. In other specific examples, the substantially spherical metal powder can have an average particle aspect ratio of less than 1.2 or less than 1.1. As used herein, "aspect ratio" refers to the longest linear dimension of a particle divided by the shortest linear dimension of the particle.

The metal, calcium de-oxygenation agent, and calcium halide-containing salt can be combined before heating the mixture to the de-oxygenation temperature. Alternatively, the ingredients can be heated individually and then mixed, or any combination of the ingredients can be heat and mixed in any order. Regardless of the particular mixing and heating steps used, in some embodiments the metal, calcium de-oxygenation agent, and calcium halide-containing salt can be present together at the de-oxygenation temperature for a period of time to reduce the oxygen content of the metal. Thus, the mixture can be heated at the de-oxygenation temperature for a period of time, or in other words, heat can be applied to raise the temperature of the mixture to the de-oxygenation temperature, to maintain the mixture at the de-oxygenation temperature for a period of time, or both.

In some embodiments, the metal, calcium de-oxygenation agent, and calcium-containing salt can each be a particulate or granular material. These materials can be mixed together to provide good contact between the calcium-containing salt, metal, and calcium de-oxygenation agent. However, in many cases little or no mixing is needed because the calcium-containing salt melts during the de-oxygenation process, and the molten salt provides a good rate of diffusion of calcium ions to the metal particles even if the ingredients are not well mixed.

Figure 2:
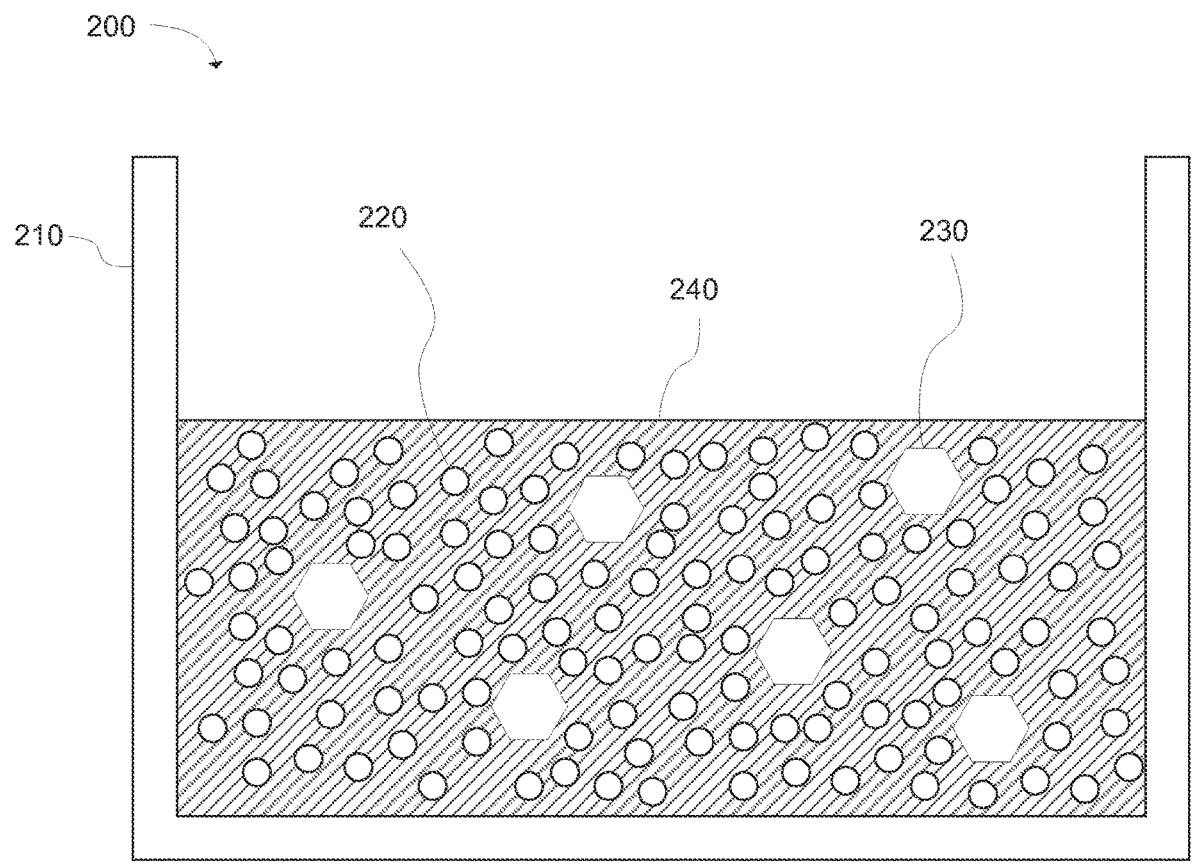
FIG. 2 shows a de-oxygenation system, in accordance with an embodiment of the present invention.

FIG. 2 shows a cross-sectional schematic view of a de-oxygenation system 200, in accordance with one specific example of the present invention. A reaction vessel 210 contains a mixture of titanium powder 220, granular calcium 230, and molten calcium chloride 240. In some cases, the metal powder can be fully immersed within the molten salt. However, the metal powder does not always need to totally immerse in the molten salt. For example, a small amount of salt that forms a thin film around each powder can be sufficient to accomplish de-oxygenation. Accordingly, in some cases, 10 wt. % salt is sufficient. In this example, the titanium powder is the metal to be de-oxygenated, the granular calcium is the calcium de-oxygenation agent, and the calcium chloride is the calcium-containing salt as a molten reaction medium. The molten calcium chloride contacts both the titanium powder and the granular calcium. Thus, calcium ions formed from the granular calcium can diffuse to the surfaces of the titanium powder particles to react with oxygen from the titanium powder particles.

In further embodiments, the amounts of metal, calcium de-oxygenation agent, and calcium-containing salt can be selected to minimize the oxygen content in the de-oxygenated metal. The amount of calcium de-oxygenation agent used can have at least a molar equivalent amount of calcium atoms as the molar amount of oxygen atoms in the metal to be de-oxygenated. Each calcium atom reacts with one oxygen atom to form CaO. Therefore, in some examples, the molar ratio of calcium atoms in the calcium de-oxygenation agent to oxygen atoms in the metal can be at least 1. In further examples, the molar ratio of calcium atoms in the calcium de-oxygenation agent to oxygen atoms in the metal is from about 1 to about 2, in some cases to 3, and in other cases to 5. In a particular example, the molar ratio can be about 1.1 to provide a small excess of calcium atoms.

The amount of calcium halide-containing salt used is not particularly limited. However, in some examples the amount of salt can be sufficient that a majority of metal particles and calcium de-oxygenation particles are contacted by molten salt during the de-oxygenation process. In further examples, the mass ratio of calcium-containing salt to metal can be from about 0.2 to about 1. In a particular example, the mass ratio of calcium-containing salt to metal can be about 0.5.

As described above, the mixture of metal, calcium de-oxygenation agent, and calcium-containing salt can be held at a de-oxygenation temperature for a period of time to reduce the oxygen content of the metal to form a de-oxygenated metal. The de-oxygenation temperature can be above the melting point of the calcium-containing salt, but below the melting point of the calcium de-oxygenating agent. In some embodiments, the de-oxygenation temperature can be from about 400° C. to about 850° C., and in some cases up to 900° C. In further embodiments, the de-oxygenation temperature can be at least higher than the melting point of the calcium-containing salt, in some cases at least 10° C. higher, and in other cases 30° C. higher.

Minimizing the temperature at which the de-oxygenation occurs has benefits such as reduced energy use, reducing corrosive and thermal damage to reaction vessels, reduced evaporation of the calcium de-oxygenation agent, and reduced sintering of metal powder particles during the de-oxygenation process. Lower temperatures can also allow for a more pure metal product, as some impurities are more likely to enter the metal at higher temperatures. For example, the diffusion coefficient of iron in titanium at 1000° C. is 100 times higher than that at 650° C. ($5 \times 10^{-11}$ m$^2$/sec vs. $5 \times 10^{-13}$ m$^2$/sec). Accordingly, when the de-oxygenation is carried out at lower temperatures, the likelihood of impurities contaminating the metal product can be greatly reduced. This can expand the range of options for reaction vessel materials available to be used for the de-oxygenation. Materials such as steel, which can contaminate titanium or other metal at higher temperatures, can be used at the lower temperatures of the present methods with little contamination of the de-oxygenated metal.

Figure 3:
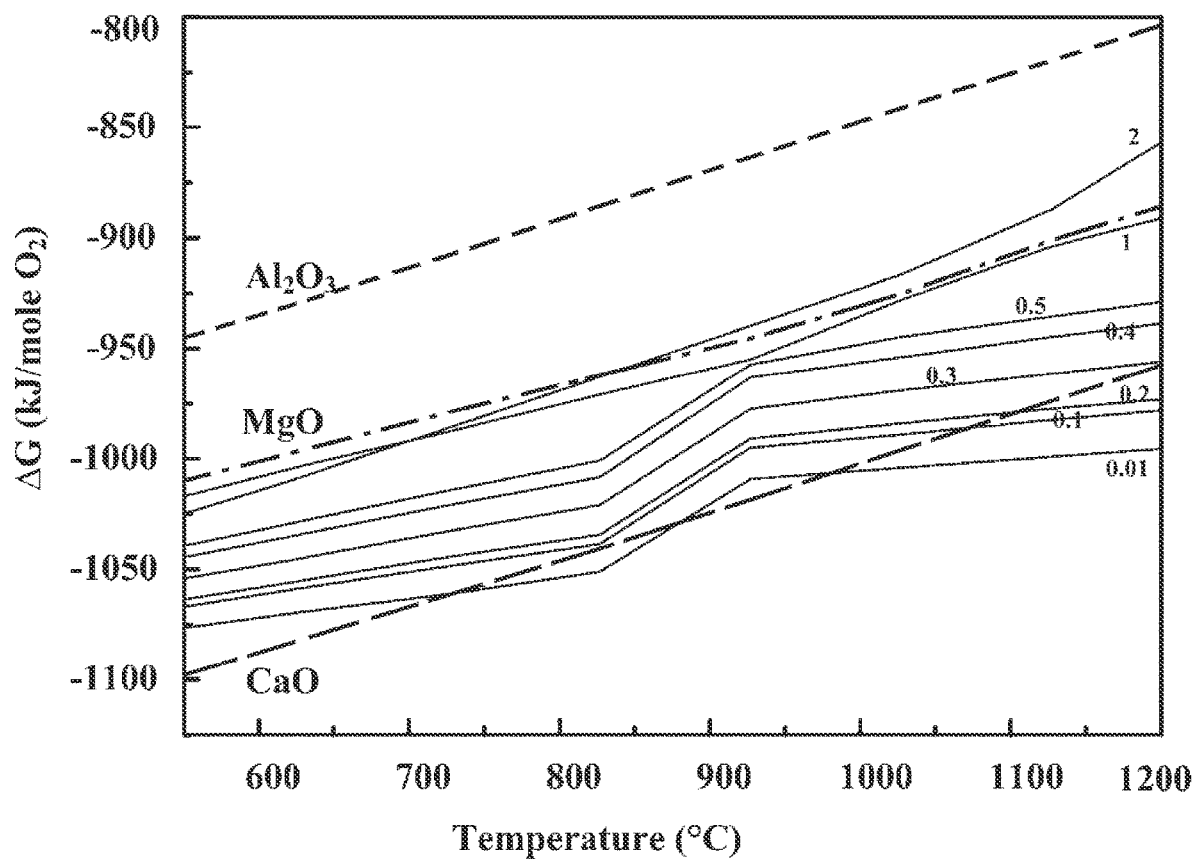
FIG. 3 is an Ellingham diagram showing the temperature dependence of Gibbs energy ($\Delta G$) for aluminum oxide ($Al_2O_3$), magnesium oxide (MgO), calcium oxide (CaO) and titanium having a variety of different oxygen contents (shown as solid lines with the oxygen content written next to each line).

Additionally, in some cases lower temperatures can allow for a lower thermodynamic limit on the final oxygen content achievable in the de-oxygenated metal. FIG. 3 is an Ellingham diagram showing the temperature dependence of Gibbs energy ($\Delta G$) for aluminum oxide ($Al_2O_3$), magnesium oxide (MgO), calcium oxide (CaO) and titanium having a variety of different oxygen contents (shown as solid lines with the oxygen content written next to each line). Based on the Gibbs energies of CaO and titanium, calcium can reduce the oxygen content of titanium to lower levels as the reaction temperature is decreased.

In some examples, the mixture of metal, calcium de-oxygenation agent, and calcium-containing salt can be heated to a de-oxygenation temperature and then held isothermally for a period of time to reduce the oxygen content of the metal. However, some fluctuation of the temperature during the de-oxygenation can be allowable. For example, the de-oxygenation temperature may vary within the range between the melting point of the calcium-containing salt and the melting point of the calcium de-oxygenation agent. In some examples, the de-oxygenation temperature can be maintained at about 30° C. above the melting point of the calcium-containing salt.

Generally, the time for de-oxygenation to occur can be selected to achieve any desired level of oxygen reduction. In many cases, the oxygen content can be reduced to acceptable levels after a time period from about 1 min to about 120 hours. Longer times can be used when the particle has a relatively larger size. In some cases, the time period can be from about 1 hour to about 12 hours.

The de-oxygenation can be performed under a controlled inert or reducing atmosphere. In some examples, the controlled atmosphere can comprise flowing or static hydrogen, argon, or combinations thereof. In one specific example, heating the mixture at the de-oxygenation temperature is performed under an $H_2$ atmosphere. In another example, the controlled atmosphere includes $H_2$ and inert gas mixed atmosphere. Although argon can typically be used as the inert gas, other inert gases (e.g. noble gases) can also be used. In yet another example, heating of the mixture can include flow with hydrogen during the entire process, flowed with argon during heating or cooling and flowed with hydrogen during isothermal holding, or flowed with argon during heating, cooling and part of the isothermal holding and flowed with hydrogen during part of the isothermal holding.

If a reducing atmosphere is used, a portion of the metal being de-oxygenated can often be converted to a corresponding metal hydride during the de-oxygenation. Thus, the product de-oxygenated metal can be a metal hydride, or additional processing steps can be performed to dehydrogenate the metal hydride.

Figure 4:
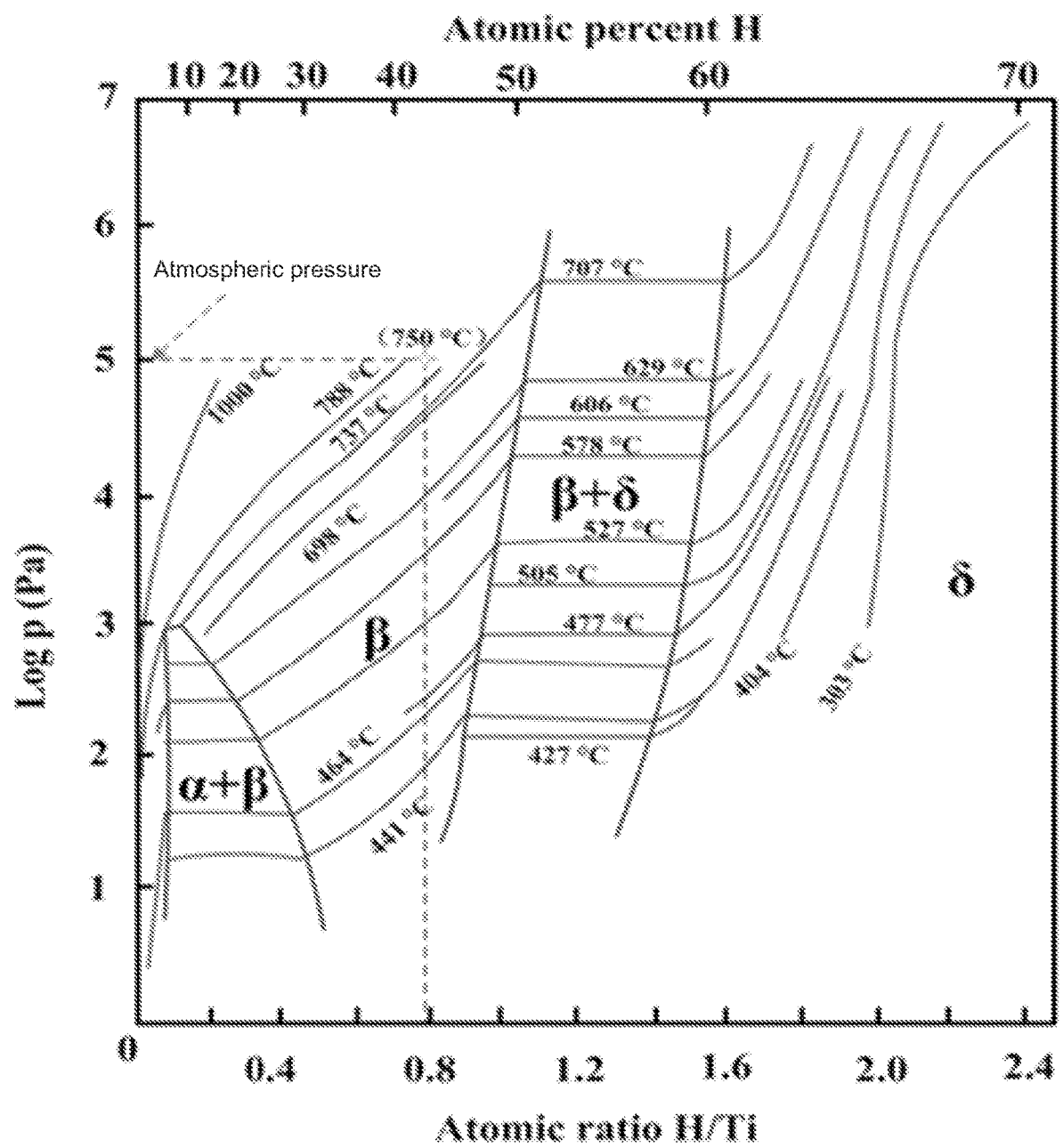
FIG. 4 is a P-C-T diagram of TiH.
Figure 5:
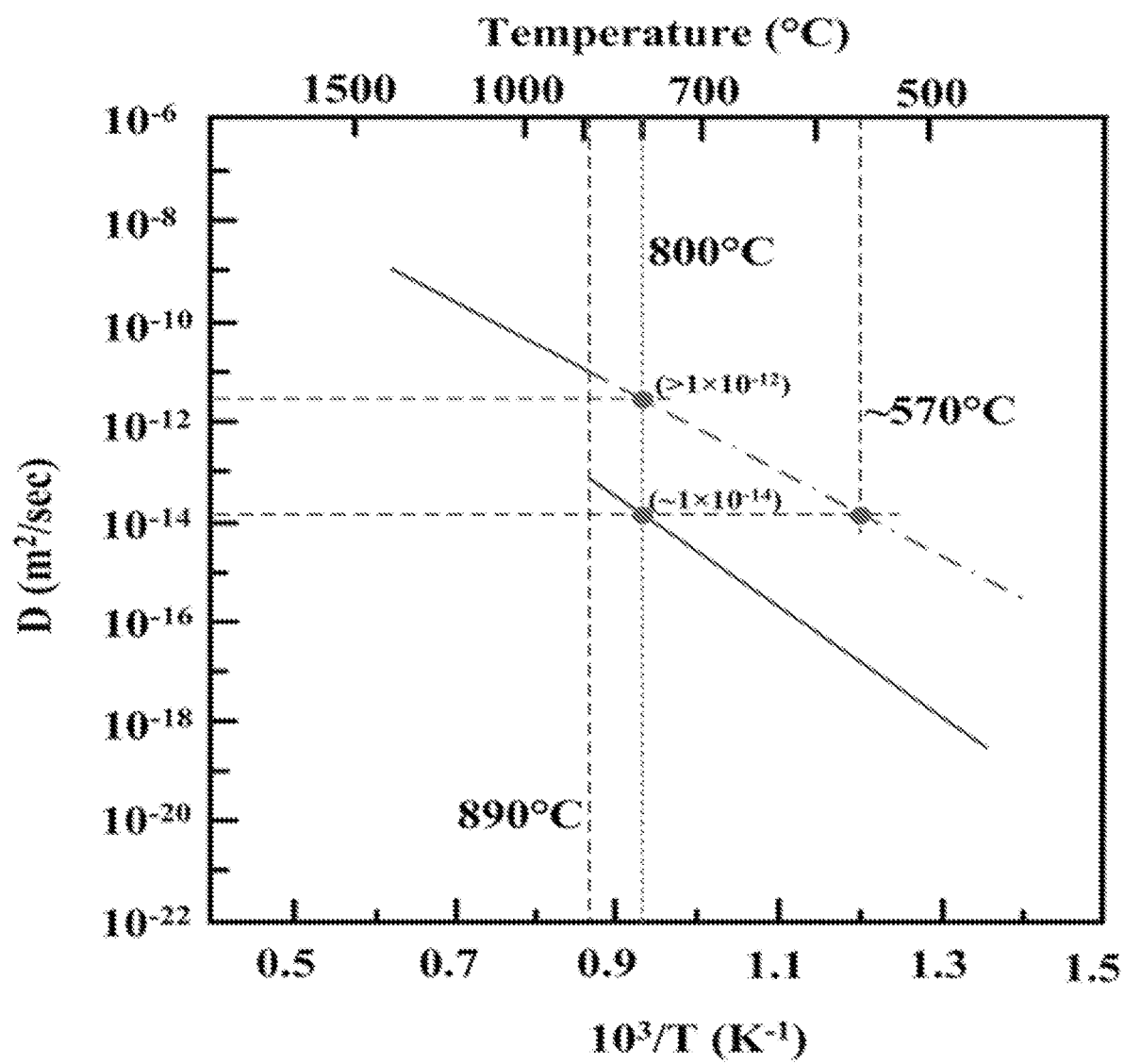
FIG. 5 is a graph of diffusion coefficient of oxygen in alpha and beta titanium vs. temperature.
Figure 6:
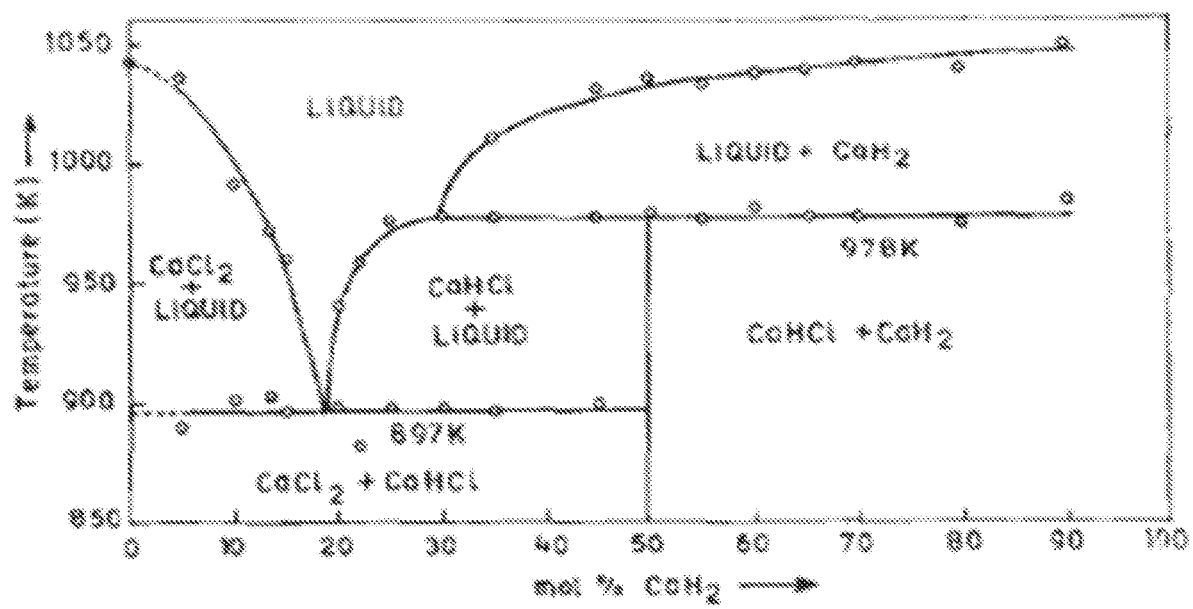
FIG. 6 is a $CaCl_2$—$CaH_2$ phase diagram.
Figure 7:
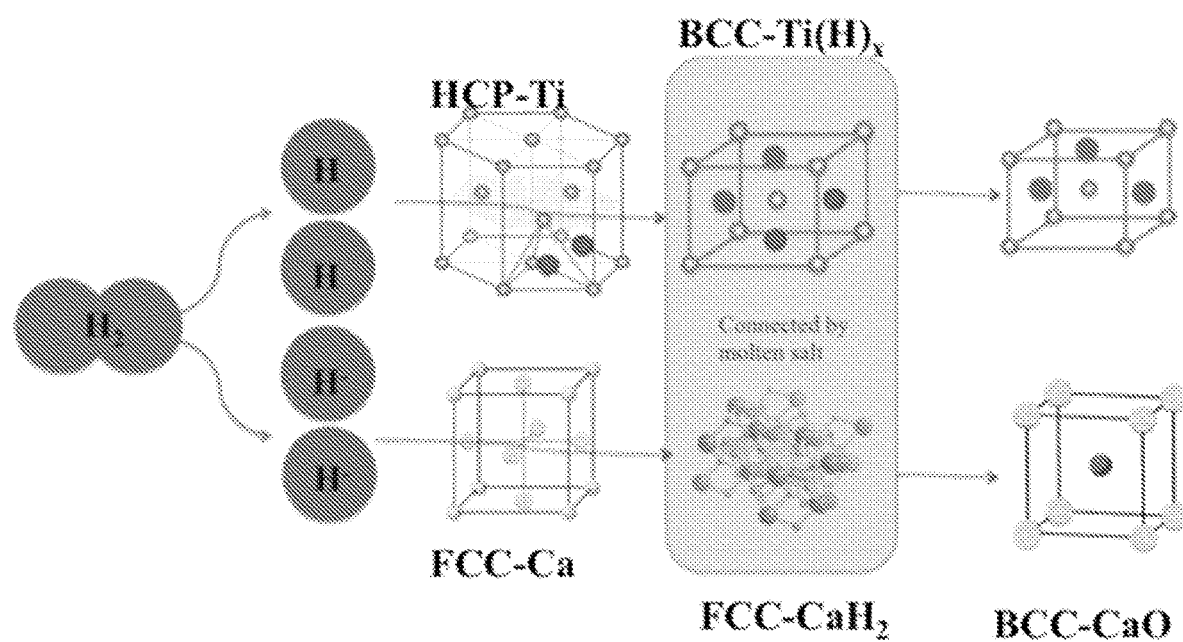
FIG. 7 is a schematic illustration of the effect of $H_2$ on Ca, Ti and the $CaCl_2$ salt in accordance with one aspect of the present invention. Red spot marked as oxygen, blue spot as H and grey spot as titanium, and yellow spot as calcium.
Figure 8:
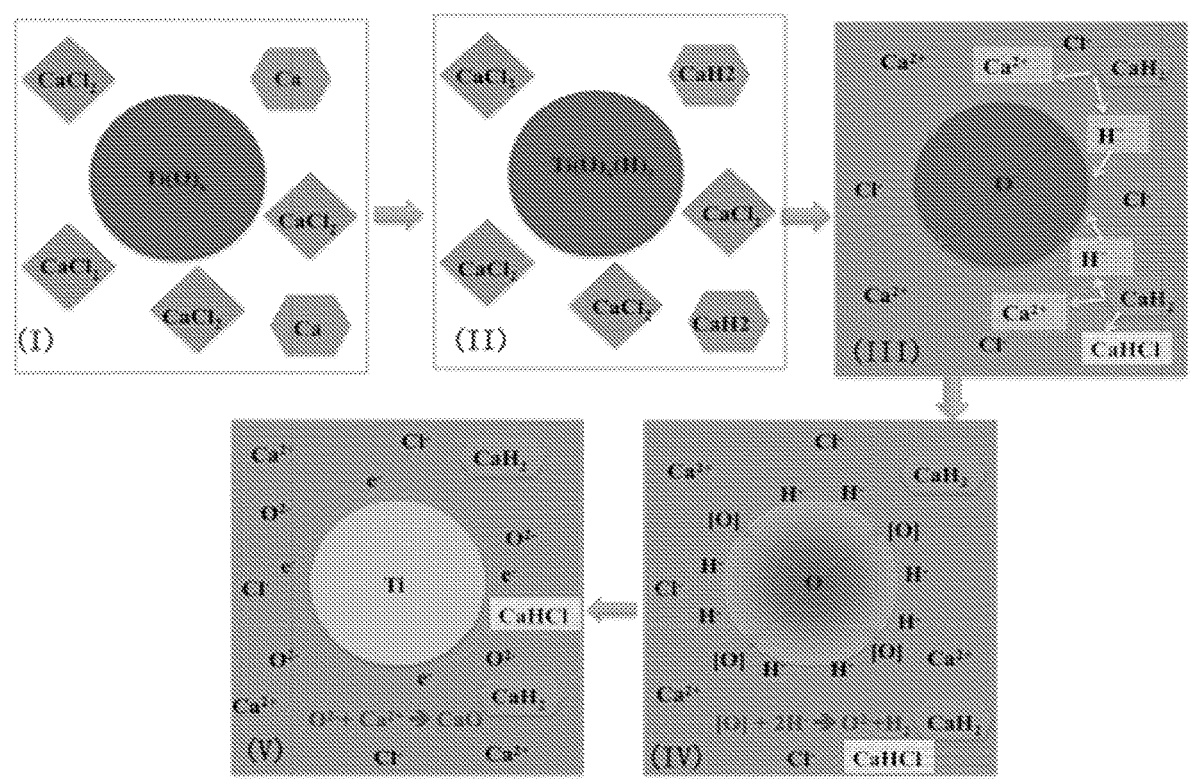
FIG. 8 is a schematic illustration of the mechanism of calcium de-oxygenation in $H_2$ atmosphere in accordance with one aspect of the present invention.

In one embodiment, the de-oxygenation process is performed in a hydrogen atmosphere. The presence of hydrogen during the de-oxygenation of Ti using Ca is found to be particularly effective. Hydrogen improves both the thermodynamic driving force and the kinetics of the reaction between Ca and oxygen in Ti. The effects of hydrogen can be theorized as follows. FIG. 4 shows the P-C-T relationship between Ti and H. $H_2$ is a beta phase stabilizer. For example, at 1 atm $H_2$ pressure and 750 C, Ti is in the beta phase range. Thermodynamically, $\beta$-Ti(O) is less stable than $\alpha$-Ti(O). FIG. 5 shows there is ~50 KJ/mol difference for beta Ti-0.2 wt. % O compared with that for alpha Ti-0.2 wt. % O at 750 C. Also, less activation energy is required for the diffusion of oxygen in $\beta$-Ti(O)(138 KJ/mol vs 219 KJ/mol for $\alpha$-Ti (O). Moreover, hydrogen transforms calcium to calcium hydride, which is an ionic bonding compound and has a salt like structure. In the molten form, calcium hydride presents with $Ca^{2+}$ and $H^-$. In addition, as calcium hydride dissolves as an ionic bonding compound, it has a large solubility in the other salt like calcium chloride. For example, calcium hydride would react with calcium chloride to form calcium hydride chloride. As seen the calcium hydride-calcium chloride diagram in FIG. 6, at the reaction temperature of 750° C., there exists a liquid which consists of $Ca^{2+}$, $Cl^-$ and $H^-$, which acts as the de-oxygenation agent. After cooling to room temperature, the salt consists of $CaH_2$+CaHCl or $CaCl_2$+CaHCl, which are uniformly mixed together, making the final step of leaching very fast because of strong reaction between $CaH_2$ and $H_2O$ or CaHCl and $H_2O$ instead of dissolution of $CaCl_2$ into $H_2O$. Kinetically, the kinetics of O diffusion in $\beta$-Ti improved by 100 times compared with that in a-Ti phase at the range of 500-800 C, as shown in FIG. 6. The total effect of $H_2$ in the system can be illustrated in FIG. 7. H atom transforms $\alpha$-Ti into $\beta$-Ti by sitting into the interstitial sites, making oxygen in titanium less stable; $H_2$ reacts with calcium to form an ionic bonding compound calcium hydride by offering a $H^-$ to calcium; the deoxygenation agent and $\beta$-Ti with a certain oxygen level was connected by the molten salt, removing the oxygen to a relative low level and producing the by-product CaO. Similar to FIG. 7, the mechanism of de-oxygenation in $H_2$ can be illustrated in FIG. 8. In some cases, like at the temperature below 700° C., CaHCl presents as a solid form. Referring to FIG. 8, titanium oxide with a salt and Ca deoxygenation agent is shown in steps I and II. In step III, a molten salt environment is formed and oxygen within the titanium material diffuses from central locations of the titanium powder (or other titanium material) to outer exposed surfaces where deoxygenation occurs as outlined.

Figure 9:
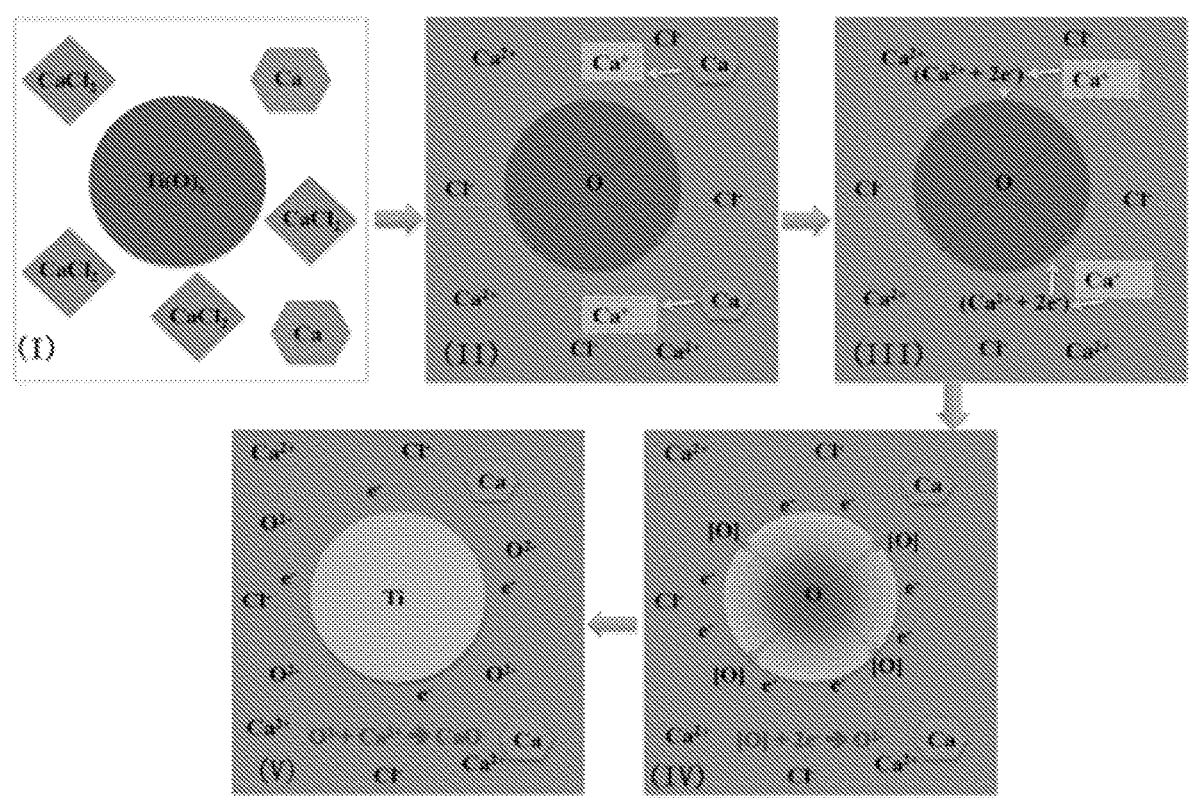
FIG. 9 is a schematic illustration of the mechanism of calcium de-oxygenation in Argon atmosphere in accordance with one aspect of the present invention.

As deoxygenation in Ar, calcium can dissolve into the molten salt, making a more effective contact with titanium, $Ca^{2+}$ can be present in the system to build a bridge letting Ca easily dissolving into the salt as illustrated schematically in FIG. 9. Thus, the salt can be a calcium halide-containing salt during deoxygenation in Ar. For example, calcium chloride, calcium bromide, calcium iodide, or combinations of these salts can be used as a primary salt. In one aspect, the salt can consist of a calcium halide salt. In one specific example, the calcium halide salt is calcium chloride. Alternatively, the salt can include a calcium halide salt and at least one additional alkali halide salt that lowers the melting point below that of the deoxygenation agent (e.g. broadly below 850° C.).

While deoxygenation in $H_2$, calcium transforms into an ionic bonding compound calcium hydride, which has a high solubility in any other molten salt, leaving $Ca^{2+}$, and $H^-$ in the molten salt system. In this case, $Ca^{2+}$ can be omitted in the salt component such that the salt can be a non-calcium halide containing salt such as an alkali halide salt. Regardless, a low melting temperature salt acts as a medium to work as a bridge between the metal powder and the de-oxygenation agent. The de-oxygenation mechanisms are different in hydrogen versus argon atmosphere. For example, in Ar, $Ca^{2+}$ is included. Further, a single salt can be used if the reaction temperature is higher than the melting point of the salt. For example, at 800° C., a single $CaCl_2$ salt (m.p: 774° C.) can be used. If a lower temperature is desired, a secondary salt, even third salt (e.g. a ternary eutectic) can be used to further lower the melting temperature. The secondary salt and any additional salts can be any alkali halide salt having a melting point below 850° C. More particularly, salts having a melting point below 842° C. when Ca is used, or below 816° C. when $CaH_2$ is used as the deoxygenation agent. Suitable alkali halide salts can include alkali metal halides and alkaline earth metal halides. Non-limiting examples of suitable alkali halide salts can include halide salts of Li, Na, K, Mg, Ca, and combinations of these salts. Corresponding halogens can include Cl, Br, and I, although Cl can be most readily available. Accordingly, non-limiting examples of alkali halide salts include LiCl, KCl, $CaCl_2$, $MgCl_2$, and combinations of these salts.

In contrast, with an $H_2$ atmosphere, $Ca^{2+}$ can be provided via $CaH_2$ which is an ionic bonding salt soluble in most salts. Thus, any salt that does not affect deoxygenation can be used with an $H_2$ atmosphere which also has a melting point below that of the deoxygenation agent (e.g. 842° C. for Ca or 816° C. for $CaH_2$). Alkali halide salts can include alkali metal halides and alkaline earth metal halides. Non-limiting examples of suitable alkali halide salts can include halide salts of Li, Na, K, Mg, Ca, and combinations of these salts. Corresponding halogens can include Cl, Br, and I, although Cl can be most readily available. Accordingly, non-limiting examples of salts include LiCl, KCl, $CaCl_2$, $MgCl_2$, and combinations of these salts. Thus, in an $H_2$ atmosphere the salt can consist of a calcium halide salt, although in some cases the salt can be essentially free of calcium (i.e. the deoxygenation agent is the source of calcium). In some cases, under an $H_2$ atmosphere, a single alkali halide salt can be used such as LiCl, $CaCl_2$, KCl, or $MgCl_2$. In one specific example, the salt can be LiCl. In another example, an $H_2$ atmosphere, the salt can be a binary or ternary salt mixture, including two or more salts. In one specific example, the salt is a $MgCl_2$—LiCl mixture. Notably, under an $H_2$ atmosphere, additional salts can be used in combination with alkali halide salts as long as they have a suitably low melting point as described herein, exist as a liquid at the reaction temperature, and do not oxidize the metal.

When deoxygenation occurs in $H_2$, the reaction temperature can be lower than the melting point of the salt used. Because deoxygenation agent $CaH_2$ is also a kind of salt, it can react with the salt to form some eutectic liquid before the melting point of the salt. For example, as shown in $CaH_2$—$CaCl_2$ salt, at 897 K, there is a eutectic reaction between $CaH_2$ and $CaCl_2$. Thus, when $CaH_2$ is used or Ca deoxygenation in $H_2$, the effect of $CaH_2$ on the melting of the salt can be considered. For example, see Examples 4 and 10 herein, where the reaction temperature is actually lower than the melting point of $CaCl_2$. Furthermore, in some cases, the atmosphere can include a mixture of hydrogen and argon.

The present methods can be used to reduce the oxygen content of metals to commercially acceptable levels, even with starting oxygen content up to 14.3 wt. % (for Ti). For example, the oxygen level in titanium can be reduced to less than 1,000 ppm by weight from as high as 20,000 ppm, which exceeds the requirement of the highest grades of titanium and its alloys. In further embodiments, the oxygen content of the de-oxygenated metal can be less than 0.3 wt %. In some examples, the oxygen content can be less than 0.15 wt % or less than 0.1 wt % to meet specifications for metals with very low content of interstitial elements. For example, in ELI grade titanium alloys, the oxygen content of the titanium powder is less than 0.1 wt %. Lower oxygen content can also allow for some pickup of oxygen during subsequent steps such as forming a metal product using powder metallurgy.

In further examples, the present de-oxygenation methods can be applied to titanium having an oxygen content from about 0.2 wt % to about 40 wt %. In more specific examples, the metal to be de-oxygenated can have an oxygen content from about 0.2 wt % to about 3 wt %. The oxygen content can be reduced to a level from less than 0.1 wt % to less than 0.3 wt %. Thus, the total amount of oxygen reduction can be from more than 39.9 wt % to about 0.1 wt %.

After the de-oxygenation process, the de-oxygenated metal can be separated from the calcium halide-containing salt, excess calcium de-oxygenation agent, and CaO formed during the de-oxygenation. The CaO can be leached in an aqueous solution containing acid such as HCl, although other leaching agents may be suitable. In some examples, the metal can be a metal powder and the powder can be a loose, flowable powder with independent particles after leaching. In one particular example, the final de-oxygenated product can be spherical titanium or titanium alloy powder with oxygen content less than 0.3%, or often less than 0.2%. For leaching, normally the de-oxygenated product is leached with water to remove most of salt and by-product CaO. The remaining by-product can then be leached with a small amount of HCl or other acid aqueous solution.

In further examples, the present de-oxygenation methods can be applied to titanium powders from a variety of source materials, such as $TiH_2$, titanium scrap, $TiO_2$, or other forms of titanium. Additionally, any powder morphology can be used, such as spherical, irregular, granular, or other powder morphologies.

In some examples, the de-oxygenated metal can be in form of a frangible body of partially sintered metal particles. This can occur if a metal powder is de-oxygenated and the particles become partially sintered during de-oxygenation. This can also occur when the metal powder is manufactured using a method that involves partial sintering of metal particles, such as forming spherical titanium powder by granulizing smaller particles and partially sintering the titanium granules. In such examples, the metal can be in the form of a partially sintered body before the de-oxygenation process is performed. The frangible body can be subjected to ball milling or other crushing techniques to break up the contacts between sintered particles. Other methods can also be used to break the frangible body. In some examples, breaking up the frangible body can yield a substantially spherical metal powder. The substantially spherical powder can include spherical or nearly-spherical particles. Spherical or near-spherical includes particles which are suitable for 3D printing and which have dimensions which are low aspect ratio and avoid jagged or irregular shapes.

EXAMPLES

Example 1

De-oxygenation of Ti powder with 1.5 wt. % oxygen with $CaCl_2$ as the molten salt in Ar. Ti powder with the size of 45-106 μm, weighing 10 grams, was mixed with 1 gram 6 mesh calcium granular and 10 grams $CaCl_2$ powder and put into a stainless steel crucible. All mixing was done using a hand shaking under a dry atmosphere. The crucible contained with the mixture was placed in a tube furnace. The furnace was vacuum pumped and then flushed with regular argon, then this operation was repeated three times prior to heating. The furnace was then heated to 800° C. with a heating rate of 10 C/min and held for 12 h in a flowing Ar atmosphere. The furnace was then cooled down to room temperature and opened. The treated product was then taken out from the crucible and leached with dilute HCl for 4 hours. The ph value of the acid was controlled between 2 and 5. The leached product was then washed with water for 3 times and rinsed with ethanol and finally dried in vacuum. The oxygen content of the Ti powder was decreased from an initial value of 1.5 wt. % to a final concentration of 0.053 wt. %, a reduction of 96.5%.

Example 2

De-oxygenation of Ti-6Al-4V powder with 4.98 wt. % oxygen with $CaCl_2$—KCl eutectic salt as the molten salt in Ar. Ti-6Al-4V powder with the size of 25-106 μm, weighing 10 grams, was mixed with 1 gram 6 mesh calcium granular, 8.5 grams $CaCl_2$ powder and 1.5 gram KCl powder and put into a Mo crucible. All mixing was done using a hand shaking under a dry atmosphere. The crucible contained with the mixture was placed in a tube furnace. The furnace is vacuum pumped and then flushed with regular argon, then this operation is repeated three times prior to heating. The furnace was then heated to 750° C. with the heating rate of 10 C/min and held for 15 h in a flowing Ar atmosphere. The furnace was then cooled down to room temperature and opened. The treated product was then taken out from the crucible and leached with water first and then with dilute acetic acid for 4 hours. The ph value of the acid was controlled between 2 and 5. The leached product was then washed with water three times and rinsed with ethanol and finally dried in vacuum. The oxygen content of the $TiH_2$ granular was decreased from an initial value of 4.98 wt. % to a final concentration of 0.079 wt. %, a reduction of 98.4%.

Example 3

De-oxygenation of Ti powder with 2.5 wt. % oxygen with $CaCl_2$—LiCl eutectic salt as the molten salt in $H_2$. Ti powder with the size of 25-106 μm, weighing 10 grams, was mixed with 1 gram 6 mesh calcium granular, 4.5 grams $CaCl_2$ powder, 0.5 grams LiCl powder was mixed and put into a stainless steel crucible. All mixing was done by hand shaking under a dry atmosphere. The crucible contained with the mixture was placed in a tube furnace. The furnace was vacuum pumped and then flushed with regular argon, then this operation was repeated three times prior to heating. The furnace was then heated to 700° C. with the heating rate of 10 C/min and held for 4 h in a flowing $H_2$ atmosphere. The furnace was then cooled down to room temperature and purged with Ar for 0.5 hour and then opened. The treated product was then taken out from the crucible and leached with water first and then with dilute acetic acid for 1 hours. The ph value of the acid was controlled between 2 and 5. The leached product was then washed with water three times and rinsed with ethanol and finally dried in vacuum for 24 h. The oxygen content of the Ti powder was decreased from an initial value of 2.5 wt. % to a final concentration of 0.12 wt. %, a reduction of 95.2%.

Example 4

De-oxygenation of Ti powder with 2.5 wt. % oxygen with $CaCl_2$ eutectic salt as the molten salt in Ar and $H_2$. Ti powder with the size of 25-106 μm, weighing 10 grams, was mixed with 3 gram 6 mesh calcium granular, 5 grams $CaCl_2$ powder was mixed and put into a stainless steel crucible. All mixing was done by hand shaking under a dry atmosphere. The crucible contained with the mixture was placed in a tube furnace. The furnace was vacuum pumped and then flushed with regular argon, then this operation was repeated three times prior to heating. The furnace was then heated to 750° C. with the heating rate of 10 C/min and held for 6 h in a flowing $H_2$ atmosphere. And then the gas is switched to Ar. The furnace was then cooled down to room temperature and then opened. The treated product was then taken out from the crucible and leached with water first and then with dilute acetic acid for 1 hours. The ph value of the acid was controlled between 2 and 5. The leached product was then washed with water three times and rinsed with ethanol and finally dried in vacuum for 24 h. The oxygen content of the Ti powder was decreased from an initial value of 2.5 wt. % to a final concentration of 0.07 wt. %, a reduction of 97.2%.

Example 5

De-oxygenation of Ti-6Al-4V scrap with 1 wt. % oxygen with $CaBr_2$—KBr eutectic salt as the molten salt in Ar. Ti-6Al-4V scrap with the size of <74 μm, weighing 10 grams, was mixed with 2 gram 6 mesh calcium granular, 9.5 grams $CaBr_2$ powder and 0.5 gram KBr powder and put into a stainless steel crucible. All mixing was done by hand shaking under a dry atmosphere. The crucible contained with the mixture was placed in a tube furnace. The furnace was flushed with regular argon for 1 h prior to heating. The furnace was then heated to 800° C. with the heating rate of 10 C/min and held for 1 h in a flowing Ar atmosphere. The furnace was then cooled down to room temperature and opened. The treated product was then taken out from the crucible and leached with 200 ml dilute HCl for 4 hours. The pH value of the acid was controlled between 2 and 5. The leached product was then washed with water three times and rinsed with ethanol and finally dried in vacuum for 24 h. The oxygen content of the Ti-6Al-4V scrap was decreased from an initial value of 0.74 wt. % to a final concentration of 0.058 wt. %, a reduction of 92.2%.

Example 6

De-oxygenation of Ti-6Al-4V-xH scrap powder with 1 wt. % oxygen with $CaCl_2$—$CaBr_2$ eutectic salt as the molten salt in Ar. Ti-6Al-4V-xH scrap with the size of <74 μm, weighing 10 grams, was mixed with 2 gram 6 mesh calcium granular, 7 grams $CaCl_2$ powder and 3 gram $CaBr_2$ powder and put into a titanium crucible. All mixing was done by hand shaking under a dry atmosphere. The crucible contained with the mixture was placed in a tube furnace. The furnace was vacuum pumped and then flushed with regular argon, then this operation was repeated three times prior to heating. The furnace was then heated to 750° C. with the heating rate of 10 C/min and held for 1 h in a flowing Ar atmosphere. The furnace was then cooled down to room temperature and opened. The treated product was then taken out from the crucible and leached with 200 ml dilute HCl for 4 hours. The pH value of the acid was controlled between 2 and 5. The leached product was then washed with water three times and rinsed with ethanol and finally dried in vacuum for 24 h. The oxygen content of the Ti-6Al-4V scrap was decreased from an initial value of 0.74 wt. % to a final concentration of 0.0780 wt. %, a reduction of 89.5%.

Example 7

De-oxygenation of Ti-6Al-4V scrap with 2 wt. % oxygen with $CaCl_2$—LiCl—KCl eutectic salt as the molten salt in Ar. Ti-6Al-4V-xH scrap with the size of <74 μm, weighing 10 grams, 2 gram 6 mesh calcium granular, 5.66 grams $CaCl_2$ powder, 1.22 grams KCl powder and 3.12 grams LiCl powder, were mixed and put into a stainless steel crucible. All mixing was done by hand shaking under a dry atmosphere. The crucible contained with the mixture was placed in a tube furnace. The furnace was vacuum pumped and then flushed with regular argon, then this operation was repeated three times prior to heating. The furnace was then heated to 600° C. with the heating rate of 10 C/min and held for 4 h in a flowing Ar atmosphere. The furnace was then cooled down to room temperature and opened. The treated product was then taken out from the crucible and leached with 200 ml dilute HCl for 4 hours. The pH value of the acid was controlled between 2 and 5. The leached product was then washed with water three times and rinsed with ethanol and finally dried in vacuum for 24 h. The oxygen content of the Ti-6Al-4V scrap was decreased from an initial value of 1.13 wt. % to a final concentration of 0.145 wt. %, a reduction of 87.2%.

Example 8

De-oxygenation of Nb-30 wt. % Hf powder with 0.2 wt. % oxygen with $CaCl_2$—KCl eutectic salt as the molten salt. Nb-30 wt. % Hf powder with the size of <37 μm, weighing 10 grams, 1 gram 6 mesh calcium granular, 8.5 grams $CaCl_2$ powder, 11.5 grams KCl powder were mixed and put into a stainless steel crucible. All mixing was done by hand shaking under a dry atmosphere. The crucible contained with the mixture was placed in a tube furnace. The furnace was flushed with regular argon for 1 h prior to heating. The furnace was then heated to 750° C. with the heating rate of 10 C/min and held for 1 h in a flowing Ar atmosphere. The furnace was then cooled down to room temperature and opened. The treated product was then taken out from the crucible and leached with 200 ml dilute $HNO_3$ for 4 hours. The ph value of the acid was controlled between 2 and 5. The leached product was then washed with water three times and rinsed with ethanol and finally dried in vacuum for 24 h. The oxygen content of the Nb-30 wt. % Hf powder was decreased from an initial value of 0.22 wt. % to a final concentration of 0.055 wt. %, a reduction of 75%.

Example 9

De-oxygenation of Ti powder with 2.5 wt. % oxygen with LiCl salt in $H_2$. Ti powder with the size of 25-106 μm, weighing 10 grams, was mixed with 3 gram 6 mesh calcium granular, 5 grams LiCl powder and put into a stainless steel crucible. All mixing was done by hand shaking under a dry atmosphere. The crucible contained with the mixture was placed in a tube furnace. The furnace was flushed with regular argon for 1 h prior to heating. The furnace was then heated to 700° C. with the heating rate of 10 C/min and held for 2 h in a flowing $H_2$ atmosphere. The furnace was then cooled down to room temperature with flowing Ar atmosphere and then opened. The treated product was then taken out from the crucible and leached with water first and then with dilute acetic acid for 1 hours. The pH value of the acid was controlled between 2 and 5. The leached product was then washed with water three times and rinsed with ethanol and finally dried in vacuum for 24 h. The oxygen content of the Ti powder was decreased from an initial value of 2.5 wt. % to a final concentration of 0.069 wt. %, a reduction of 97.2%.

Example 10

De-oxygenation of Ti powder with 2.5 wt. % oxygen with $MgCl_2$—LiCl salt in $H_2$. Ti powder with the size of 25-106 μm, weighing 10 grams, was mixed with 3 gram 6 mesh calcium granular, 4 grams $MgCl_2$ and 1 gram LiCl powder and put into a stainless steel crucible. All mixing was done by hand shaking under a dry atmosphere. The crucible contained with the mixture was placed in a tube furnace. The furnace was flushed with regular argon for 1 h prior to heating. The furnace was then heated to 650° C. with the heating rate of 10 C/min and held for 12 h in a flowing $H_2$ atmosphere. The furnace was then cooled down to room temperature with flowing Ar atmosphere and then opened. The treated product was then taken out from the crucible and leached with water first and then with dilute acetic acid for 1 hours. The pH value of the acid was controlled between 2 and 5. The leached product was then washed with water three times and rinsed with ethanol and finally dried in vacuum for 24 h. The oxygen content of the Ti powder was decreased from an initial value of 2.5 wt. % to a final concentration of 0.076 wt. %, a reduction of 97.0%.

Example 11

De-oxygenation of Ti-6Al-4V powder with 4 wt. % oxygen with $CaCl_2$ salt in $H_2$. and Ar atmosphere.

Ti-6Al-4V powder with the size of 45-106 μm, weighing 10 grams, was mixed with 4 gram 6 mesh calcium granular, 5 grams $CaCl_2$ powder and put into a stainless steel crucible. All mixing was done by hand shaking under a dry atmosphere. The crucible contained with the mixture was placed in a tube furnace. The furnace was flushed with regular argon for 1 h prior to heating. The furnace was then heated to 750° C. with the heating rate of 10 C/min and held for 2 h in a flowing $H_2$ atmosphere and held for another 2 h in Ar atmosphere. The furnace was then cooled down to room temperature with flowing Ar atmosphere and then opened. The treated product was then taken out from the crucible and leached with water first and then with dilute acetic acid for 1 hours. The ph value of the acid was controlled between 2 and 5. The leached product was then washed with water three times and rinsed with ethanol and finally dried in vacuum for 24 h. The oxygen content of the Ti powder was decreased from an initial value of 4 wt. % to a final concentration of 0.063 wt. %, a reduction of 98.4%.

The foregoing detailed description and examples describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of removing dissolved oxygen from a metal, comprising:
   forming a mixture comprising a metal having a dissolved oxygen content, a calcium de-oxygenation agent, and a salt, wherein the calcium de-oxygenation agent is present in an amount such that a molar ratio of calcium atoms in the calcium de-oxygenation agent to oxygen atoms in the metal is from about 1 to 5;
   heating the mixture at a de-oxygenation temperature for a period of time in a controlled atmosphere to reduce the dissolved oxygen content of the metal to form a de-oxygenated metal, wherein the de-oxygenation temperature is above a melting point of the salt and below a melting point of the calcium de-oxygenation agent; and
   cooling the de-oxygenated metal.

2. The method of claim 1, wherein the metal is in a form of powders, milled articles, finished articles, scrap material, turning, cuttings, chips, chunks, or combinations thereof.

3. The method of claim 1, wherein the metal is in the form of a metal powder and has an average particle diameter from about 1 μm to 10 mm.

4. The method of claim 1, wherein the metal has an average diameter from about 1 μm to 10 cm.

5. The method of claim 1, wherein the metal comprises titanium, zirconium, hafnium, thorium, vanadium, niobium, tantalum, chromium, molybdenum, tungsten, hydrides thereof, alloys thereof, or combinations thereof.

6. The method of claim 1, wherein the metal comprises titanium.

7. The method of claim 1, wherein the calcium de-oxygenation agent comprises calcium metal, $CaH_2$, or combinations thereof.

8. The method of claim 1, wherein the controlled atmosphere includes argon and the salt comprises a calcium halide-containing salt.

9. The method of claim 8, wherein the calcium-containing salt further comprises a secondary halide salt of a metal other than calcium.

10. The method of claim 8, wherein the calcium-containing salt is a eutectic mixture with a melting point from about 400° C. to about 770° C.

11. The method of claim 1, wherein the controlled atmosphere comprises hydrogen and the salt includes an alkali metal halide salt, an alkaline earth metal halide salt, a non-alkali halide salt, or combination thereof.

12. The method of claim 11, wherein the salt is non-calcium halide-containing salt including an alkali halide salt, or alkali halide-alkali halide eutectic salt.

13. The method of claim 12, wherein the non-calcium halide-containing salt is selected from the group consisting of potassium halide, lithium halide, magnesium halide, sodium halide, and combinations thereof.

14. The method of claim 1, wherein the de-oxygenation temperature is from about 400° C. to about 850° C.

15. The method of claim 1, wherein the controlled atmosphere comprises argon, hydrogen, or a combinations thereof.

16. The method of claim 1, further comprising:
    leaching the de-oxygenated metal with water then an acid; and
    drying the de-oxygenated metal.

17. The method of claim 16, wherein the drying occurs in air or by freeze drying in vacuum.

18. The method of claim 1, wherein the oxygen content of the de-oxygenated metal is less than about 0.1 wt %.

19. A method of removing dissolved oxygen from a metal powder, comprising:
    a) mixing a calcium de-oxygenation agent with a metal powder to be deoxygenated according to a specific ratio depending on an amount of dissolved oxygen to be removed to form a powder mixture, wherein the calcium de-oxygenation agent includes solid calcium (Ca), calcium hydride ($CaH_2$), or both, wherein the specific ratio is a molar ratio of calcium atoms in the calcium de-oxygenation agent to oxygen atoms in the metal is from about 1 to 5;
    b) blending the powder mixture with a salt to form a blended mixture, wherein the salt has a melting point below a melting point of the calcium de-oxygenation agent;
    c) heating the blended mixture to a high temperature for a period of time, in an inert or reducing atmosphere, sufficient to reduce dissolved oxygen content of the metal powder below a predetermined oxygen threshold to form a de-oxygenated metal powder, wherein the high temperature is above a melting point of the salt and below the melting point of the calcium de-oxygenation agent; and
    d) cooling the de-oxygenated metal powder.

20. The method of claim 19, wherein the heating is in an inert atmosphere and the salt comprises calcium halide salt, calcium halide-alkali halide eutectic salt, calcium halide-calcium halide eutectic salt, or a combination thereof, to form a blended mixture.

21. The method of claim 19, wherein the heating is in a reducing atmosphere and the salt comprises an alkali halide salt, and optionally a non-calcium alkali halide salt.

* * * * *

UNITED STATES PATENT AND TRADEMARK OFFICE
CERTIFICATE OF CORRECTION

PATENT NO. : 10,610,929 B2
APPLICATION NO. : 15/314464
DATED : April 7, 2020
INVENTOR(S) : Zhigang Zak Fang et al.

It is certified that error appears in the above-identified patent and that said Letters Patent is hereby corrected as shown below:

In the Specification

Column 1, Line 10, add:
GOVERNMENT INTEREST
This invention was made with government support under grant no. DE-AR0000420 awarded by the Department of Energy. The government has certain rights in the invention.

Signed and Sealed this
Fourth Day of August, 2020

Andrei Iancu
*Director of the United States Patent and Trademark Office*